(12) United States Patent
Mason et al.

(10) Patent No.: US 7,987,289 B2
(45) Date of Patent: Jul. 26, 2011

(54) PARTICIPATING IN CLOUD AS TOTALLY STUBBY EDGE

(75) Inventors: Kevin Mason, Kirkland, WA (US);
Jeffrey Paul Jensen, San Jose, CA (US);
Robert Pike, Woodinville, WA (US);
Albert Greenberg, Seattle, WA (US);
Parantap Lahiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 286 days.

(21) Appl. No.: 12/144,693

(22) Filed: Jun. 24, 2008

(65) Prior Publication Data

US 2009/0319688 A1 Dec. 24, 2009

(51) Int. Cl.
*G06F 15/173* (2006.01)
*G01R 31/08* (2006.01)

(52) U.S. Cl. ........ 709/242; 709/223; 709/225; 709/238; 709/243; 370/230; 370/351

(58) Field of Classification Search .................. 709/223, 709/242; 370/230, 251
See application file for complete search history.

(56) References Cited

U.S. PATENT DOCUMENTS

| | | | |
|---|---|---|---|
| 6,301,662 B1 | 10/2001 | Hardjono | |
| 7,120,120 B2 | 10/2006 | Guerin et al. | |
| 7,257,731 B2 | 8/2007 | Hunt et al. | |
| 7,327,683 B2 | 2/2008 | Ogier et al. | |
| 7,852,758 B2 * | 12/2010 | Kataoka et al. | 370/230 |
| 2003/0193944 A1 * | 10/2003 | Sasagawa | 370/389 |
| 2005/0163137 A1 * | 7/2005 | Wakumoto et al. | 370/406 |
| 2005/0286511 A1 * | 12/2005 | Johnsen et al. | 370/389 |
| 2007/0070893 A1 * | 3/2007 | Butenweg et al. | 370/230 |
| 2007/0086361 A1 | 4/2007 | Allan et al. | |
| 2007/0239987 A1 * | 10/2007 | Hoole et al. | 713/169 |
| 2007/0255812 A1 | 11/2007 | Mirtorabi et al. | |
| 2008/0069105 A1 * | 3/2008 | Costa et al. | 370/392 |
| 2009/0241108 A1 * | 9/2009 | Edwards et al. | 718/1 |

OTHER PUBLICATIONS

Fedyk, et al., "Provider Link State Bridging (PLSB)", Date: Jan. 2007, pp. 1-10.
Huang, et al., "Addressing Intra-Domain Network Security Issues through Secure Link-State Routing Protocol: A New Architectural Framework", Date: Apr. 2005, pp. 1-14.
Li, Wei, "Inter-Domain Routing: Problems and Solutions", Technical Report TR-128, Date: Feb. 2003, pp. 1-39, http://www.ecsl.cs.sunysb.edu/tr/rpe16.ps.gz.
"Integrated Intermediate System to Intermediate System—ISIS", 3 Pages http://www.timhogan.net/ISIS.htm.

* cited by examiner

*Primary Examiner* — Ashok B Patel
*Assistant Examiner* — Linglan Edwards

(57) ABSTRACT

A Totally Stubby Edge (TSE) participates in a cloud under the condition that the TSE may select paths for frames that the TSE introduces to the cloud, but may not transit frames between nodes in the cloud. The edge submits, to an administrator of the cloud, a request to join the cloud. If the administrator allows the request, then the edge is given access to the address tables that define the structure of the cloud, and may insert itself into the structure. The edge may use the address tables to select paths for frames that the edge introduces to the cloud. Normally path decisions are made by devices that the administrator trusts and controls. However, since the TSE selects paths for its own frames but does not transit frames between other nodes in the cloud, the TSE may select paths even if it is untrusted by the administrator.

20 Claims, 7 Drawing Sheets

PARTICIPATING IN CLOUD AS TOTALLY STUBBY EDGE

BACKGROUND

Devices may be communicatively linked together in what may be referred to as an "L2 cloud." Networks are typically built on a multi-layer model, such as the Open Systems Interconnection (OSI) seven-layer model. In this model, layer-2, or "L2", is referred to as the data link, Logical Link Control (LLC) or Media Access Control (MAC) layer. L2 technologies may be used to implement local area networks, such as corporate (or other organizational) intranets. L2 technologies may also be used to transfer data between adjacent nodes in a wide-area network.

A local network (or other network) may be built as an L2 cloud, in which several devices communicate with each other using L2 technologies. An administrator may define the structure of the cloud. Conceptually, the structure of the cloud is a directional graph, where each device is a node, and connections between the nodes indicate the permissible flow of data. Different devices in the cloud may have different roles. For example, some devices may act as switches that transit data between other devices. The switches are generally given access to the graph of the network defined by the administrator, and these switches maintain an address table indicating how to reach the various nodes in the cloud. Thus, a switch may have a table that indicates how to reach nodes in the cloud—both those nodes that the switch is directly connected to, and nodes that it can reach indirectly through other nodes. The switch may use this table to direct data to particular destinations, and may do so both for data that the switch generates and for data received from other nodes.

Switching is inherently an activity that has security implications. A device that acts as a switch handles data on behalf of other devices. Thus, a device that is untrusted has the potential to cause various types of mischief with someone else's data, such as directing misuse of the data, or redirecting the data to another device that could misuse the data. In general, switches are under the control of the network administrator, so the administrator is able to trust the switches. Thus, the administrator allows switches to transit data between devices and to make switching decisions. Other devices (e.g., client devices, or non-switch server devices) may be able to participate in the cloud, but these devices are generally not allowed to make switching decisions. Non-trusted devices may specify a destination for data, but, rather than determining the actual path for the data, untrusted devices are generally given a default path along which to send the data. The default path generally leads to a switch, which uses its address table to select a path for the data to reach the specified destination.

Sometimes there are reasons to allow a non-trusted device to make switching decisions. For example, the appropriate path of the data may depend on the content of the data and how it will be used. If a non-trusted device originates the data, then that device may be in an appropriate position to determine a path for the data. However, allowing non-trusted devices to act as switches is problematic, since doing so introduces the possibility that the non-trusted device will change paths or mishandle other devices' data.

SUMMARY

A device that is not trusted may be allowed to switch data within an L2 cloud by participating in the cloud as a Totally Stubby Edge ("TSE"). An "edge" device introduces data into a cloud from elsewhere. In the field of networking, the term "totally stubby" describes regions of a network that have certain restrictions on their ability to transit data between other points in the network. The TSE thus is allowed to select the path for data it introduces to the cloud, on the condition that the TSE does not act as a transit point for data originating from other devices in the cloud. The condition of allowing the TSE to select a path for its own data, but not to transit data from other devices in the cloud, allows the network to trust the paths selected by the TSE even if the network does not trust the TSE itself.

In order to participate in a cloud as a TSE, a device (which may be physical or virtual) makes a request to the administrator to join the cloud as a TSE. The administrator may determine whether to allow the device to join the cloud. If the device is allowed to join the cloud, the administrator may provide certain parameters that govern the device's participation in the cloud. For example, the administrator may specify certain limitations on the paths that the device is allowed to use, or may allow the device to join certain groups in the cloud but not others, or may specify any other parameters. Trusted devices in the cloud may enforce the terms of a device's participation in the cloud as a TSE. For example, the switches may refuse to send data to the TSE to be transited to other devices in the cloud, even if the cloud is connected to those devices. Switches may also reject frames received from the TSE, if the tags in the frames represent switching decisions that violate the network's policy governing the TSE.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
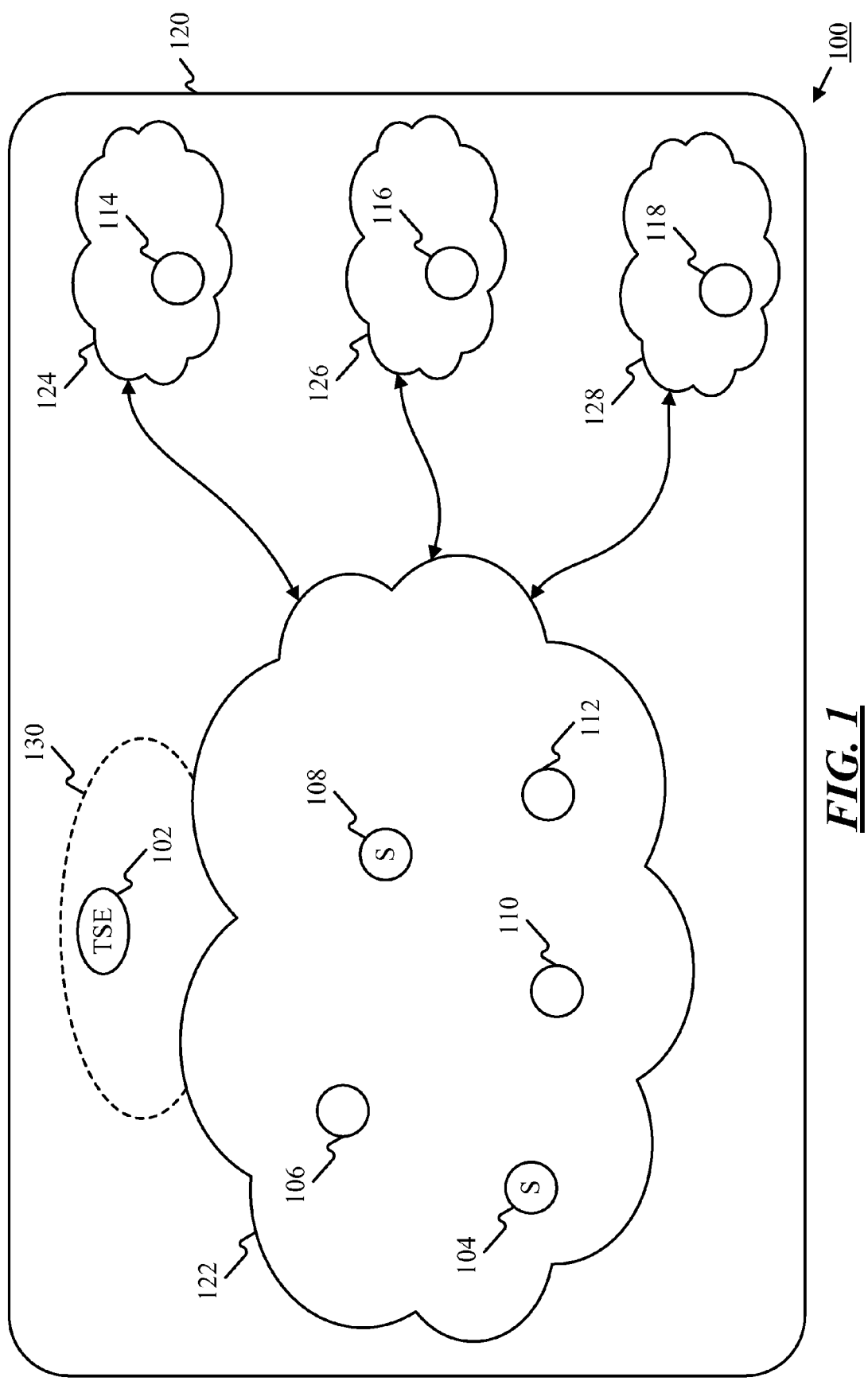
FIG. 1 is a block diagram of an example network arrangement in which an edge device may participate.

Devices may be communicatively linked to each other in an L2 cloud. Within the cloud, a path that the data will follow from one node to another is chosen by a switch. A switch has an address table that represents the structure of the cloud, and thus the switch generally knows how to reach destinations within the cloud. Making switching decisions involves having access to the tables that represent the cloud structure. Non-switch participants in the cloud generally do not have access to these tables. Thus, when the non-switch participants send data to other nodes in the cloud, they send it along one or more default paths. A device's default path generally leads to a switch. Thus, in order to send a frame from one place to another, a non-switch participant normally specifies a destination and passes the frame along the default path to a switch, where switching decisions are made. (A bridge may act as a switch that connects devices in different clouds at the L2 layers; the discussion of switches herein may also apply to bridges.)

Switches are given access to the structure of the cloud, and are allowed to transit frames and to make switching decisions, because the switches are trusted by the administrator of the cloud. For one device to handle frames on behalf of other devices has security implications, since a device that handles a frame or that makes switching decisions could either misuse the data in the frame, or could direct the data to another device that will misuse the data. Thus, normally the transiting of data and the making of switching decisions is performed only by devices that the administrator trusts.

However, there is sometimes a benefit to allowing an untrusted device to make switching decisions. The device that introduces the data to the cloud (the "edge" device) is often the source of the data. As the source, the device often knows what the data is and how it will be used, and this type of information may be relevant for making switching decisions. Since the device is untrusted, normally such a device is not permitted to make switching decisions. So, when the edge sends data, it normally passes the data along its default path to a switch, and the switch chooses a path for the data. Thus, in the interest of maintaining the security of the network, the switching decision is made by a switch without the benefit of the edge's knowledge about the data.

The subject matter described herein recognizes that the risk of allowing an untrusted edge device to choose a frame's path can be managed, as long as the device selects paths for its own data but does not transit data received from other devices in the cloud. If the device does not transit data from other devices in the cloud, then the danger that the device will mishandle another device's data may be eliminated. Moreover, restricting the device from transiting data for other devices in the cloud allows for certain restrictions to be enforced on the untrusted device's switching decisions. Normally, the path specified in a frame's tag may have been made arbitrarily-far upstream, so the actual source of the path choice may be unknown to a device that receives the frame. However, if a given device does not transit data received from other nodes in the cloud, then the address and/or tags could not have been introduced any further upstream than the device itself. Any node that receives a frame directly from the device knows that the tags were introduced by the device itself, and not by some upstream device. Thus, when a device participates as a TSE (under the restriction that TSEs do not transit frame from other devices), frames that a trusted device receives directly from the TSE can be evaluated to determine whether the TSE is choosing paths for data in accordance with the network's policy governing that TSE.

Turning now to the drawings, FIG. 1 shows an example network arrangement 100 in which an edge device may participate according to the techniques described herein. Network arrangement 100 allows a plurality of nodes to communicate with each other. FIG. 1 shows example nodes 102, 104, 106, 108, 110, 112, 114, 116, and 118, although any number of nodes could participate in network arrangement 100.

Network arrangement 100 may be viewed as existing in layers. For example, the OSI model defines seven layers of a network, and the Transport Control Protocol/Internet Protocol (TCP/IP) reference model defines five layers. The different layers may implement different functionalities, and may represent different levels of abstraction as to how data moves from one place to another. The notion of layers, and the various different layered models, are generally known and thus are not described at length herein.

FIG. 1 shows an example of how nodes 102-118 may participate in network arrangement 100 at various layers. Each of the nodes represents a device that participates in network arrangement 100, and the device may be either a physical device (e.g., a server, a personal computer, switch, a set-top box, etc.) or a virtual device (e.g., a virtual machine that exists on physical machine under control of a hypervisor). Nodes 102-118 may be joined together in cloud 120 at the network layer (which is layer-3 (L3) in the OSI model). Specific nodes may also participate in one or more layer-2 (L2) clouds 122, 124, 126, and 128. For example, nodes 104, 106, 108, 110, and 112 participate in L2 cloud 122. Additionally, a plurality of nodes may participate in each of L2 clouds 124, 126, and 128. (For purposes of illustration, example nodes 114, 116, and 118 are shown as participating in each of L2 clouds 124, 126, and 128 respectively, so that clouds 124, 126, and 128 are each depicted with one example node. However, typically each L2 cloud would have several participating nodes.) In the example of FIG. 1, L2 clouds are shown as being non-overlapping, although the clouds could overlap in the sense that a node could participate in more than one L2 cloud. Some of the nodes may function as switches or bridges; in the example of FIG. 1, such nodes are indicated by the letter "S".

In FIG. 1, node 102 is shown as not initially belonging to L2 cloud 122, and then subsequently joining L2 cloud 122. Node 102's joining of L2 cloud 122 is shown with L2 cloud 122's initial boundary being depicted by a solid line (thereby excluding node 102), and then being extended to include the area inside of dotted line 130 so as to include node 102. (Node 102 may already be participating in some other L2 cloud at the time that it joins L2 cloud 122. However, for the purpose of clarity in FIG. 1, node 102's participation in other L2 clouds is not shown, since an aspect of node 102 that is being depicted in FIG. 1 is node 102's joining of L2 cloud 122.)

Node 102 joins L2 cloud 122 as a "totally stubby edge," as indicated by the letters "TSE". In networking, "totally stubby" is an adjective that describes regions of the network that have certain restrictions on their ability to transit data between other points in the network. Also, in networking, an "edge" refers to a node that serves as an entry point into a region of the network, either as an originator of data or as a link to some other region. Thus, in describing node 102, the term "totally stubby edge" refers to node 102's ability to introduce data into L2 cloud (the "edge" part of the term TSE), and the fact that node 102 does not transit data in the cloud that originated somewhere other than node 102 (the "totally stubby" part of the term TSE). (Node 102 is not necessarily a TSE with respect to every cloud; the device associated with node 102 could participate in some other cloud and have a non-TSE role in that other cloud.)

Figure 2:
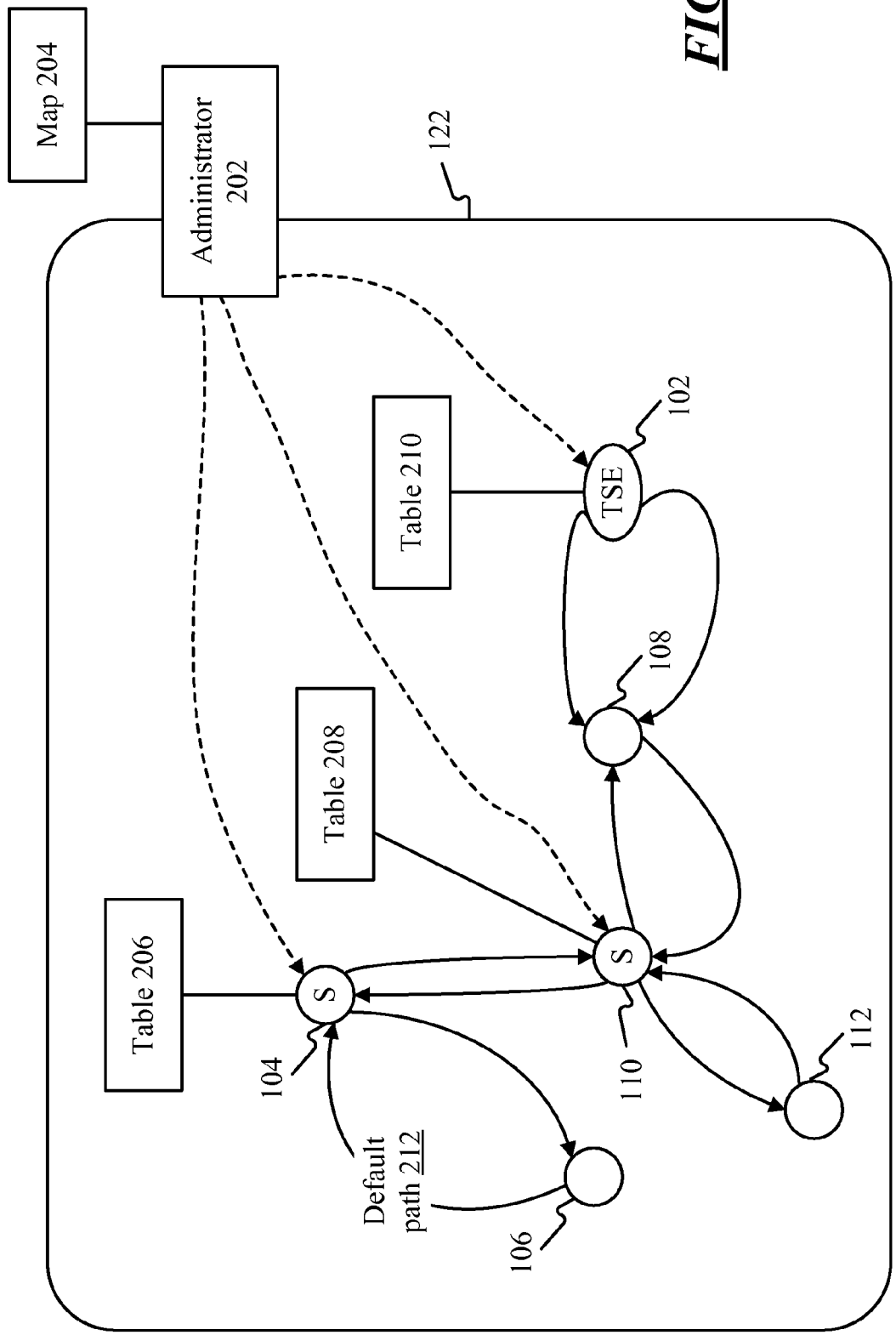
FIG. 2 is a block diagram of certain details of an example L2 cloud.

FIG. 2 shows certain example details of L2 cloud 122. An administrator 202 may control participation in L2 cloud 122. Administrator 202 may be a participant in L2 cloud 122, or may oversee L2 cloud 122 from outside of L2 cloud 122. (Administrator 202 may refer, for example, to a person who sets policy for L2 cloud 122, or to a hardware and/or software component that administers policy on behalf of such a person.) As part of controlling L2 cloud 122, administrator 202 may determine which nodes may participate in L2 cloud 122, and may also define relationships between nodes in L2 cloud 122. Thus, administrator 202 may define whether one node may send data to another, and which nodes may act as switches that transit data between other nodes. Administrator 202 may maintain a map 204 that defines the relationships between nodes in L2 cloud 122. In the diagram of FIG. 2, the nodes and their relationships to each other form a directed graph, in which each edge of the graph, as indicated by an arrow connecting one node to another, represents the fact that one node has a link to send data to another node. For example, an arrow points from node 110 to node 104, indicating that node 110 has a link to send data to node 104. Map 204 may represent these types of relationships between nodes. (As discussed above, the term "edge" may refer to a device that introduces data to a cloud, but may also refer to a connection between nodes in a graph. The meaning of a particular use of the term "edge" will be evident from context.)

Some of the nodes in L2 cloud 122 are switches, which may transit data between other nodes. A node that acts as a switch generally maintains a table that indicates how to send data to a particular destination. In the example of FIG. 2, nodes 104 and 108 have the role of switches in L2 cloud 122. Thus, nodes 104 and 108 maintain tables 206 and 208, respectively, which define where to send data that is destined for a particular node. For example, node 104 is a switch that may send data to node 106 (as indicated by the arrow leading from node 104 to node 106.) There is no arrow from node 104 and to node 108, which means that there is no direct data link from node 104 to node 108 or to node 112. However, node 104 may maintain, in table 206, an entry indicating a way in which nodes 108 and 112 are reachable indirectly. Node 104 is able to send data to node 110, which, in turn, can send data to nodes 108 and 112. Thus, table 206 may have an entry indicating that node 108 or node 112 may be reached by sending data to node 110. Table 206 may also have an entry indicating an estimated cost of using a particular path to reach a given node. The cost might be the number of hops to reach the node, an estimate of the transit time, or any other type of cost measurement. Thus, table 206 might contain the following information:

EXAMPLE OF TABLE 206

| Destination | Cost | Next hop |
| --- | --- | --- |
| Node 108 | 2 | Node 110 |
| Node 106 | 1 | Node 106 |
| Node 110 | 1 | Node 110 |
| Node 112 | 2 | Node 110 |

Thus, in the foregoing example, table 206 lists nodes that can be reached from node 104 ("destination"), and the next node to send the data to in order to reach the destination node ("next hop"). In this example, two of the destination nodes are reachable directly (nodes 106 and 110), and two nodes (nodes 108 and 112) are reachable through node 110. The example table also lists an estimated "cost" of reaching the node. In this example of table 206, the cost represents the number of hops to reach the node, although, as noted above, cost could be stated or estimated in any manner. Moreover, in the example table above, only one path to each destination is stated, although the table might have any number of paths to a given destination (with each path possibly having a different cost).

There may be security and trust issues associated with operating a network. In particular, giving a node the ability to switch data and to have access to map 204 may have security and/or trust implications. Thus, nodes that transit data (e.g., the switches) are normally under the control of administrator 202. Administrator typically does not give untrusted nodes access to map 204 or to the tables that are represented by or derived from map 204. Moreover, administrator 202 typically does not allow untrusted nodes to switch data. For example, node 106 is not a switch, and might not be trusted by administrator 202. Thus, node 106 may send data within L2 cloud 122 by using a default path 212, but does not have access to map 204, and thus does not have a table that would allow node 106 to select a path for data. Administrator 202 may enforce a policy that prevents nodes under its control from using a path that was chosen by an untrusted node. (A default path, as referred to above, is a path that one node uses to send data to a destination when the sending node does not specifically know of a path to the destination. A node uses a default path to send data when no path to the destination is listed in its address table. Since node 106 does not have an address table, node 106, by default, sends data to node 104 regardless of which node the data is destined for.)

However, an untrusted node may be permitted to join L2 cloud 122, and to choose a path for certain data, under certain limited conditions. In the example of FIG. 2, node 102 joins L2 cloud 122 as a TSE node. Joining as a TSE node may permit node 102 to select a path for data that node 102 introduces to L2 cloud and to attach, to that data, a tag representing the selected path. Moreover, node 102 may be given access to map 204 so that a table 210 may be created that allows node 102 to know how to direct data through L2 cloud 122. Since node 102's behavior is not under the control of administrator 202, administrator 202 may not trust node 102. Thus, there may be certain restrictions on node 102's participation in L2 cloud. Some example restrictions include:

Node 102 may be prevented from transiting data from other nodes. Thus, node 102 may be permitted to introduce data into L2 cloud 122 and may be permitted to attach, to data that node 102 introduces, a tag specifying a path for the data. But, unlike the switches in L2 cloud 122, node 102 may not be permitted to transit data that it receives from other nodes in L2 cloud, and may not be permitted to attach path information to such received data.

Node 102 may have, with regard to L2 cloud, the states "joined" and "not-joined."

Nodes within L2 cloud 122 may be assigned to certain groups, and there may be restrictions on which group(s) node 102 is permitted to join.

There may be limitations on what kind of path information node 102 is permitted to attach to data, and/or restrictions on what paths node 102 is allowed to select.

Administrator 202 may associate node 102 with particular identifying information, such as the MAC address of the device on which node 102 is implemented, and/or a particular port. Administrator 202 may provide this identifying information to trusted nodes in L2 cloud 122, so that these trusted nodes may reliably determine whether they have received data from node 102, and thus may enforce any restrictions on what node 102 is allowed to do—e.g., restrictions on what kinds of path information node 102 is allowed to attach, what groups within L2 cloud 122 node 102 is allowed to join, etc.

The foregoing are some example restrictions, although other restrictions could be applied.

Figure 3:
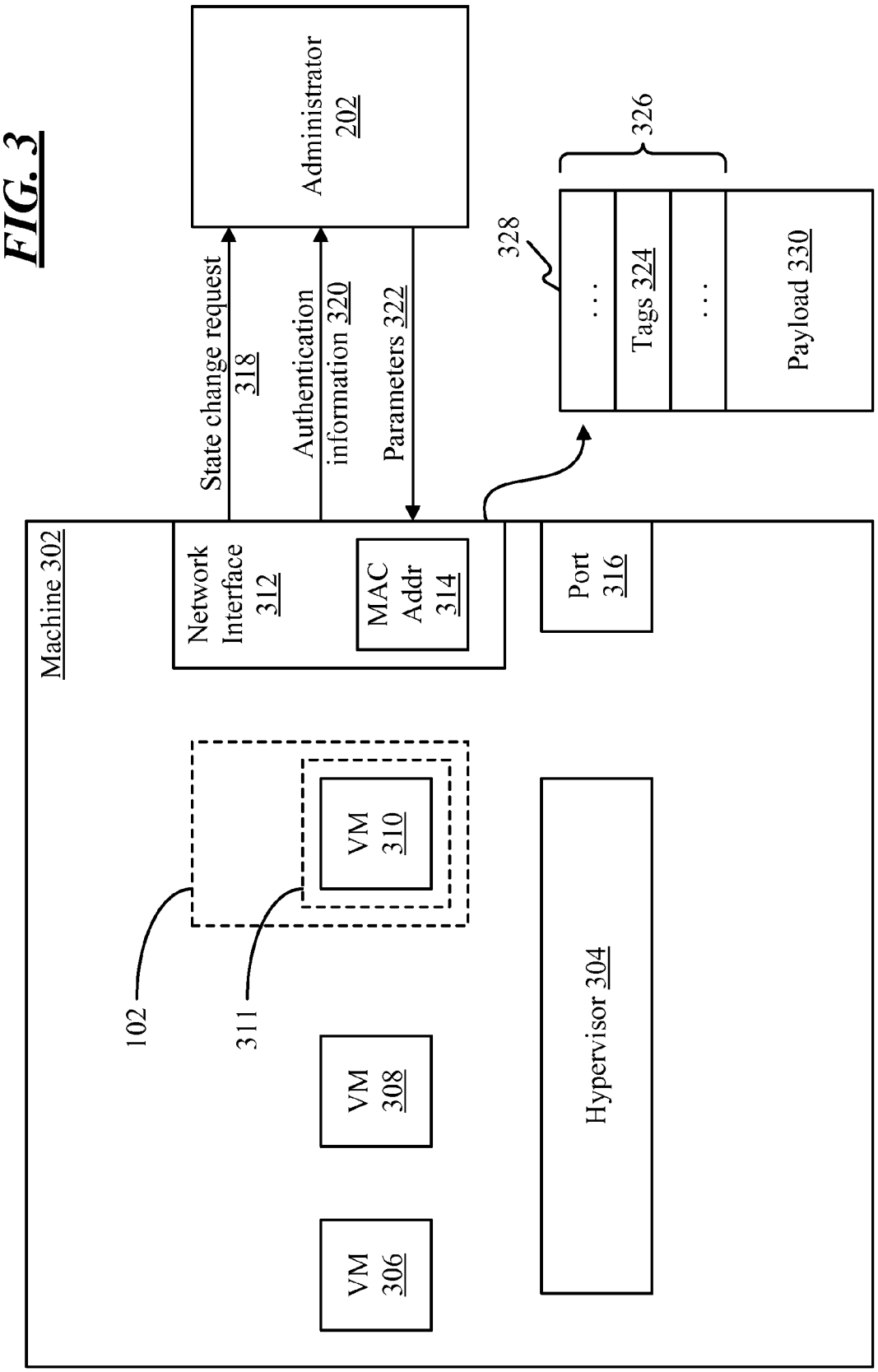
FIG. 3 is a block diagram of an example scenario in which a node participates in an L2 cloud as a totally stubby edge (TSE).

FIG. 3 shows an example scenario in which a node participates in an L2 cloud as a TSE. In particular, FIG. 3 shows a scenario in which the node that participates as a TSE is a virtual machine that is implemented on a physical machine by the physical machine's hypervisor. This example may typify the type of node that would join an L2 cloud as a TSE, although any type of device (whether a virtual machine or a physical machine) could participate in an L2 cloud as a TSE.

Machine 302 is a physical machine. In one example, machine 302 is a rack server, although it could be any type of computer or other apparatus. Hypervisor 304 maintains various execution environments on machine 302, such as virtual machines 306, 308, and 310. Hypervisor 304 may perform various actions in support of running plural virtual machines on physical machine 302, such as providing an interface between each virtual machine and machine 302's physical resources, enforcing isolation between the virtual machines, scheduling the use, by each virtual machine, of machine 302's physical processor and other physical resources, or various other actions. The use of hypervisors and virtual machines is generally known.

Machine 302 may have a network interface 312 through which machine 302 communicates with the world outside of machine 302. Network interface may, for example, be an Ethernet adapter, a WiFi adapter, or any other type of mechanism that permits machine 302 to send and/or receive data. Network interface 312 may comprise, or otherwise be associated with, a MAC address 314, which reliably identifies machine 302. As part of its participation in network communication, machine 302 may implement one or more software ports, such as port 316, which may be used to implement specific types of connections (or even connection-less communication) between machine 302 and other machines (although the data would still physically be sent through network interface 312). For example, a port could be assigned to handle communications using a connection-based or connection-less protocol, such as Fibre Channel over Ethernet (FCOE), 802.1QTrunking, IP, TCP, User Datagram Protocol (UDP), Simple Mail Transfer Protocol (SMTP), or other protocols (although ports could also be assigned on some basis other than protocol).

In the example of FIG. 3, the device that joins an L2 cloud as a TSE is virtual machine 310. A virtual machine is an example of a device that could join a cloud, but any type of device—whether physical or virtual—could join a cloud. The following discussion assumes that the device that joins the cloud is virtual machine 310, although such a virtual machine is merely an example of a device 311 that could join the cloud. Moreover, the example described below assumes that virtual machine 310 joins a cloud to communicate with other devices (virtual or physical) outside of machine 302, although a device could participate in a cloud with other virtual machines that are implemented on the same physical machine.

When virtual machine 310 joins an L2 cloud as node 102, that node may be identified to the cloud based on the MAC address 314 associated with the physical machine 302 on which virtual machine 310 is instantiated. Moreover, the node may be expected to communicate with the cloud through a particular port implemented by machine 302 (such as port 316). In other words, for the purpose of the cloud's model of which devices are participating in the cloud, the relevant device is virtual machine 310, but virtual machine 310 may borrow some of its identity from components of machine 302, such as machine 302's MAC address 314, or soft ports that are implemented by machine 302.

In order to participate as a TSE node in an L2 cloud, virtual machine 310 may send a state change request 318 to the administrator 202 of the L2 cloud. A TSE node may have the states "join in progress", "joined", "not joined" or "rejected." Thus, if virtual machine 310 is not presently participating as a node in the L2 cloud, virtual machine 310 may request to change its state from "non-joined" to "joined." Virtual machine 310 may also provide authentication information 320 to administrator 202, which may allow administrator 202 to identify the entity (e.g., virtual machine 310) that is requesting to participate in the L2 cloud. For example, virtual machine 310 could provide a digital signature, or a cryptographically-secure hash of some aspect of itself, as a way to identify itself to administrator 202. Administrator 202 may evaluate authentication information 320, and may, based on that evaluation, decide whether to allow virtual machine 310 to participate in the L2 cloud as a TSE node.

After administrator 202 has evaluated virtual machine 310's request to participate in the L2 cloud, administrator may respond by approving or denying the request. If the request is approved, administrator 202 may provide parameters 322 indicating the terms on which virtual machine 310 may participate in the L2 cloud as a TSE. For example, parameters 322 may indicate what sorts of paths virtual machine 310 may use (or not use), which groups virtual machine 310 may participate in (or may not participate in), or any other terms governing participation in the L2 cloud. Additionally, administrator 202 may provide virtual machine 310 with access to the structure of the L2 cloud. For example, administrator 202 may provide access to map 204 (shown in FIG. 2), or may provide an address table to virtual machine 310 that virtual machine 310 may use in making decisions about what paths to use to send data.

Once virtual machine 310's request to join the L2 cloud has been granted, virtual machine may send data into the L2 cloud, along with path information that virtual machine 310 has applied to the data. In an L2 cloud, path information is specified through tags 324 attached to the data. For example, some payload data 330 may be wrapped in a frame 328 in order to be transmitted from one node to another. The frame may have a header 326, and one of the items in the header may be a set of tags 324. The tags may indicate, among other things, what path the data is to take through the L2 cloud. Switches insert tags for frame that they originate, or for frames that they transit on behalf of other nodes. A TSE node does not transit data received from other nodes, but may insert tags for frames that the TSE node introduces to the cloud. There may be rules (e.g., as specified in parameters 322) that impose substantive limits on the tags that a TSE node may insert. For example, parameters 322 may specify that, when virtual machine 310 joins the L2 cloud as a TSE node, it may select a path for the data through some nodes but not through others. The nodes in the L2 cloud that are under the control of administrator 202 may enforce these restrictions. For example, nodes that are under the control of administrator 202 may reject frames with addresses or tags that violate the terms of virtual machine 310's participation in the L2 cloud, and may take some form of remedial action. (Example forms of remedial action are discussed below in connection with FIG. 6.) In general, nodes that participate in the L2 cloud under the control of administrator 202 may be provided with the terms of virtual machine 310's participation as a TSE node, and may evaluate whether the node's behavior (e.g., the particular tags inserted into a frame by the node) conform to the terms on which the node is allowed to participate in the L2 cloud.

It will be understood that, since the TSE node does not transit data from other nodes in the cloud, it can be readily determined whether the TSE node is selecting paths for data in accordance with the terms of its participation. When data is received by a node, the identity of the node that sent the data can be reliably determined in various ways: e.g., based on the MAC address associated with the node, the port associated with the node, a hash of some aspect of the node, etc. If a frame is received directly from a TSE node, then the tags in the frame were inserted by the TSE node (rather than by some upstream node in the cloud), since the TSE node does not transit data from other nodes in the cloud.

Figure 4:
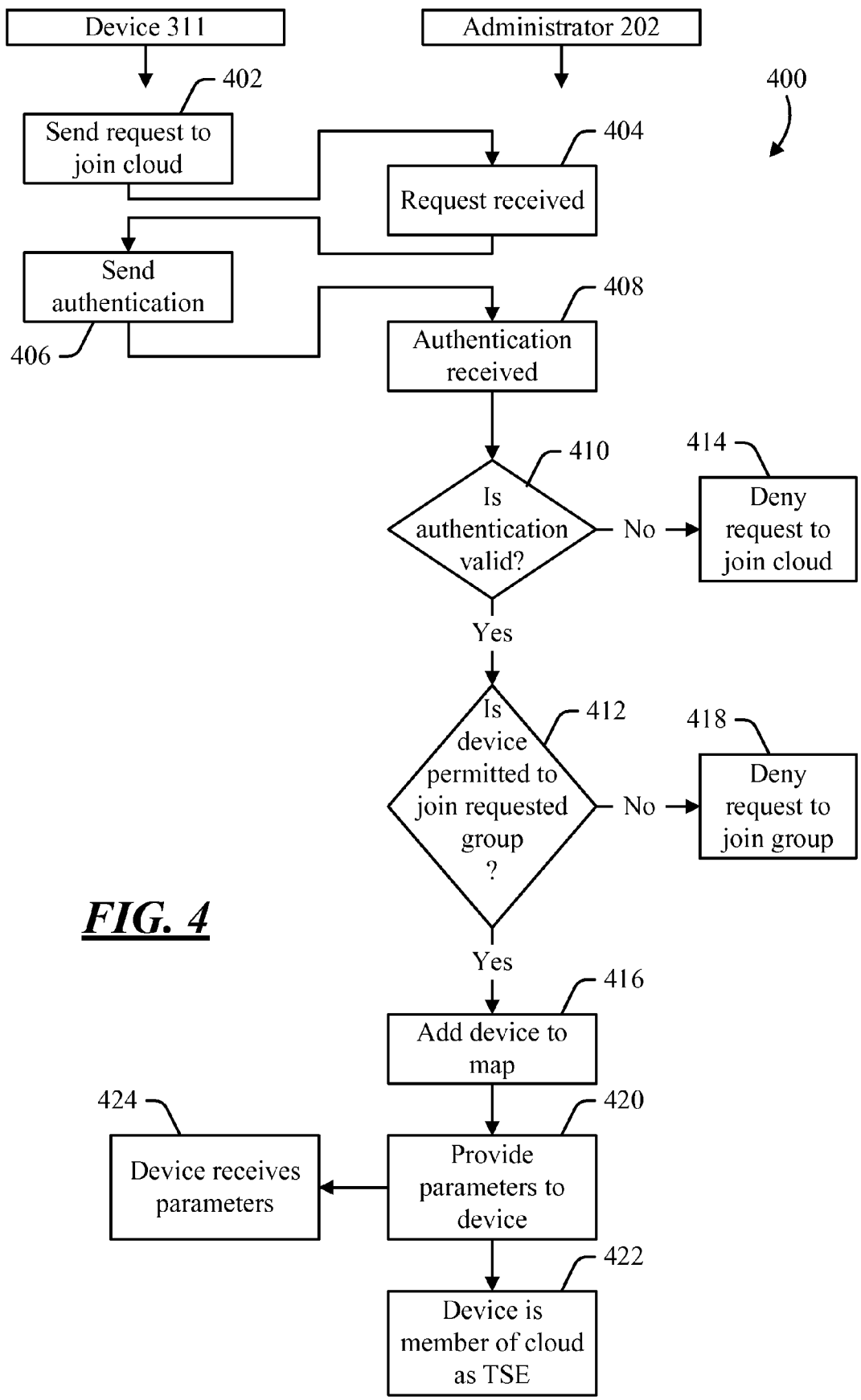
FIG. 4 is a flow diagram of an example process in which a virtual or physical device requests to join an L2 cloud as a TSE.

FIG. 4 shows an example process 400 in which a device (virtual or physical) requests to join an L2 cloud as a TSE, and may be admitted to the cloud. In the example of FIG. 2, the stages on the left side may be performed by device 311 and the stages on the right side may be performed by administrator 202 (or by a machine operated by administrator 202). However, these stages could be performed using any components. Moreover, the flow diagram in FIG. 4 (as well as that in FIG. 5, as discussed below) shows an example in which stages of a process are carried out in a particular order, as indicated by the lines connecting the blocks, but the various stages shown in the flow diagrams herein could be performed in any order, or in any combination or sub-combination.

At 402, the device sends a request to join an L2 cloud, and at 404 the request is received. With reference to FIG. 3, device 311's submitting of request 318 to administrator 202 is an example of submitted/receiving a request. At 406, the device that requests to join the network may send authentication information (e.g., a signature, a cryptographic hash, etc.) to the entity (e.g., administrator 202) that determines whether the requesting device is permitted to join the cloud. At 408, the authentication information is received.

At 410, it is determined whether the authentication information is valid. For example, the authentication information might be a signature or hash associated with a particular device. Some devices may be permitted to join a cloud as TSEs, while other may not be so permitted. In this example, the signature or hash may be verified to determine whether they are associated with a device that is permitted to join the cloud as a TSE. However, the authentication information could be verified in any manner or against any criteria. If the authentication information is valid, then process 400 proceeds to 412; otherwise, a request to join the cloud may be denied (at 414).

As noted above, a device may be permitted to join specific groups within an L2 cloud. If a device has requested to join one or more specific groups, at 412 it is determined whether the device is permitted to join the groups requested. If the device is permitted to join the requested groups, then process 400 continues to 416; otherwise, the request to join the group is denied (at 418). If the request to join a group is denied, then process 400 may still continue to 416, so that the device might be permitted to join the cloud even if it is denied membership in a requested group.

If the device has been permitted to join the cloud, then the device is added to the map of the cloud (at 416) and is given read-only access to the address and path information contained in the map. This will usually be limited to a subset of the address tables, but the administrator may choose to supply the full table set. Parameters may be provided (at 420) to the device, where the parameters govern the device's participation in the cloud, such as parameters governing what types of paths the device may specify, or what groups the device may join, or any other parameters. (These parameters are received by the device at 424.) At that point, the device is a member of the cloud as a TSE (at 422).

Figure 5:
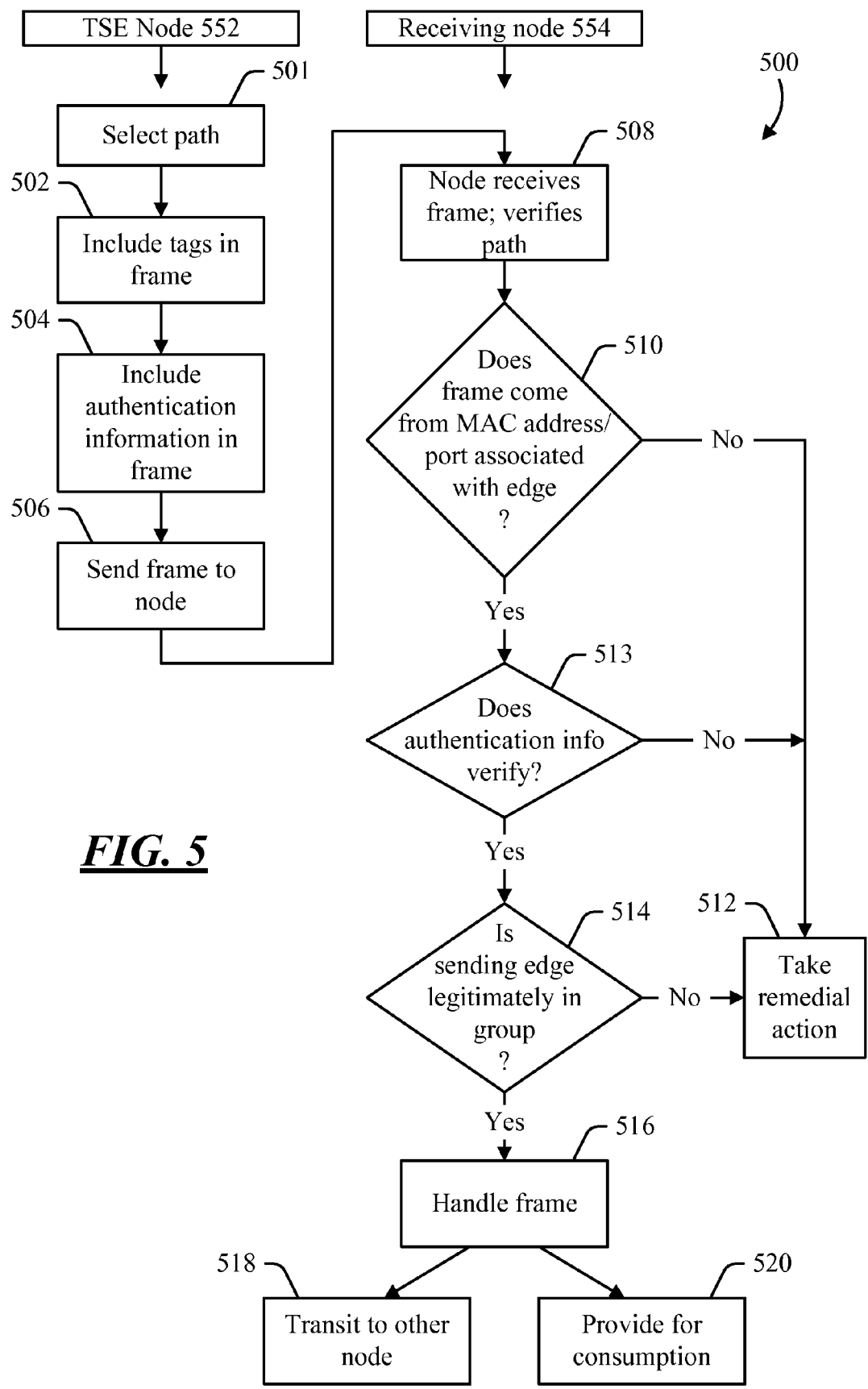
FIG. 5 is a flow diagram of an example process in which a path for data may be chosen by a node that participates in an L2 cloud as a TSE.

FIG. 5 shows an example process 500 in which a path for data may be selected by a node that participates in an L2 cloud as a TSE. In the example of FIG. 5, stages on the left side may be performed by a TSE node 552, and stages on the right side may be performed by a receiving node 554 (i.e., a node that receives data from a TSE node). However, these stages could be performed by any components.

At 501 a path may be selected for a frame that contains data to be sent to a node in the cloud. If the parameters governing the TSE's participation in the cloud specify limits on what paths the TSE may select for frames, then selection of the path may be performed in such a manner as to observe these limits. At 502, the TSE includes may include, in a frame, one or more tags that represent the selected path. At 504, the TSE may include authentication information in the frame, which may be used to authenticate the TSE that added the tag to the frame. At 506, the frame, with path information included, is sent to another node.

At 508, the node to which the frame is sent receives the frame. The node that receives the frame might not be the ultimate destination of the frame, but rather might be an intermediate node that happens to have a direct link to receive data from the TSE. The node that receives the frame may verify that the path complies with the terms of the TSE's participation in the cloud.

At 510, it may be determined whether the frame comes from a MAC address and/or from a port that is associated with the TSE. The administrator of the cloud may know the MAC address and/or port of a device that has legitimately joined the cloud, and this information may be verified in order to determine that the frame (and its path information) came from a device that is legitimately a member of the cloud as a TSE (as opposed to having come from an imposter device). If the MAC address and/or port are not consistent with what is known about the TSE, then remedial action may be taken (at 512). Examples of remedial action are discussed below in connection with FIG. 6.

If the MAC address and/or port from which the frame is received are consistent with that which is expected for the TSE, then the process continues to 513, where the authentication information in the frame (if any) may be verified. If the authentication information in the frame cannot be verified, then the process continues to 512 to take remedial action. Otherwise the process continues to 514. If the TSE is attempting to direct the path of a frame as a member of a particular group, then at 514 it may be verified whether the TSE is legitimately a member of the group. If the TSE is not a member of the group, then the process may proceed to 512 to take remedial action. Otherwise, the receiving node may handle the frame (at 516). Handling the frame may involve, for example, transiting the frame to another node (at 518). Or, if the node at which the frame is received is the destination node, then the frame may be provided to an appropriate component in order to be consumed (at 520). For example, if the L2 cloud is implementing data links for a higher layer of the network (e.g., the L3 layer), then the frame may be provided the software that implements the higher layer, so that the data in the frame can be consumed or otherwise processed by that higher layer.

Figure 6:
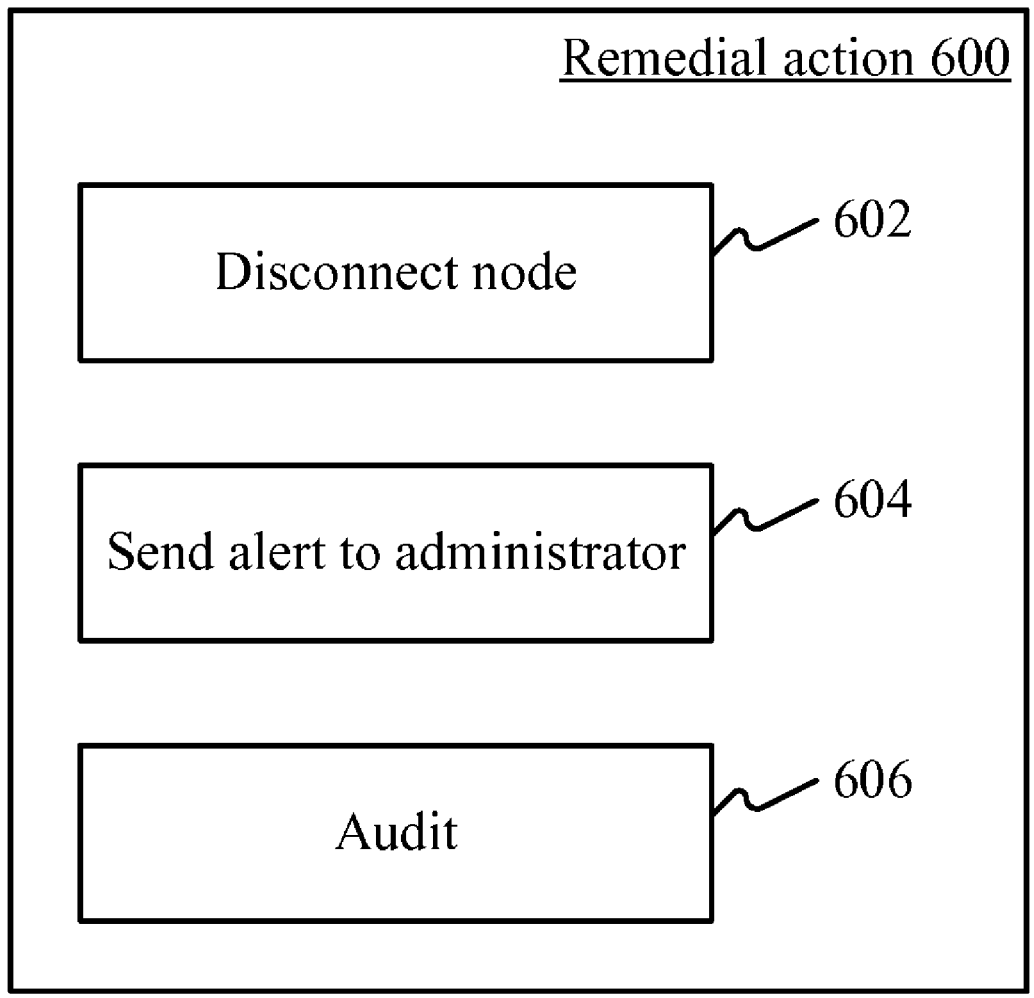
FIG. 6 is a block diagram of example remedial actions.

As noted above in connection with FIG. 5 (at 512), remedial action could be taken in response to various events. FIG. 6 shows some examples of remedial action 600. The events that lead to 512 in FIG. 5 are examples of events that could trigger remedial action 600, although other events could also trigger these actions.

One example of a remedial action is to disconnect the device from the cloud (block 602). Another example of a remedial action is to issue an alert to an administrator (block 604), at which point the administrator could decide what, if any, further action to take. Another example of a remedial action is to audit records of network transaction with which the node has been associated (block 606). The foregoing are example actions, and actions other than those shown in FIG. 6 could be taken. Moreover, FIG. 5 shows remedial actions as being taken in response to certain specific determinations, although remedial actions could be taken for any reason.

Figure 7:
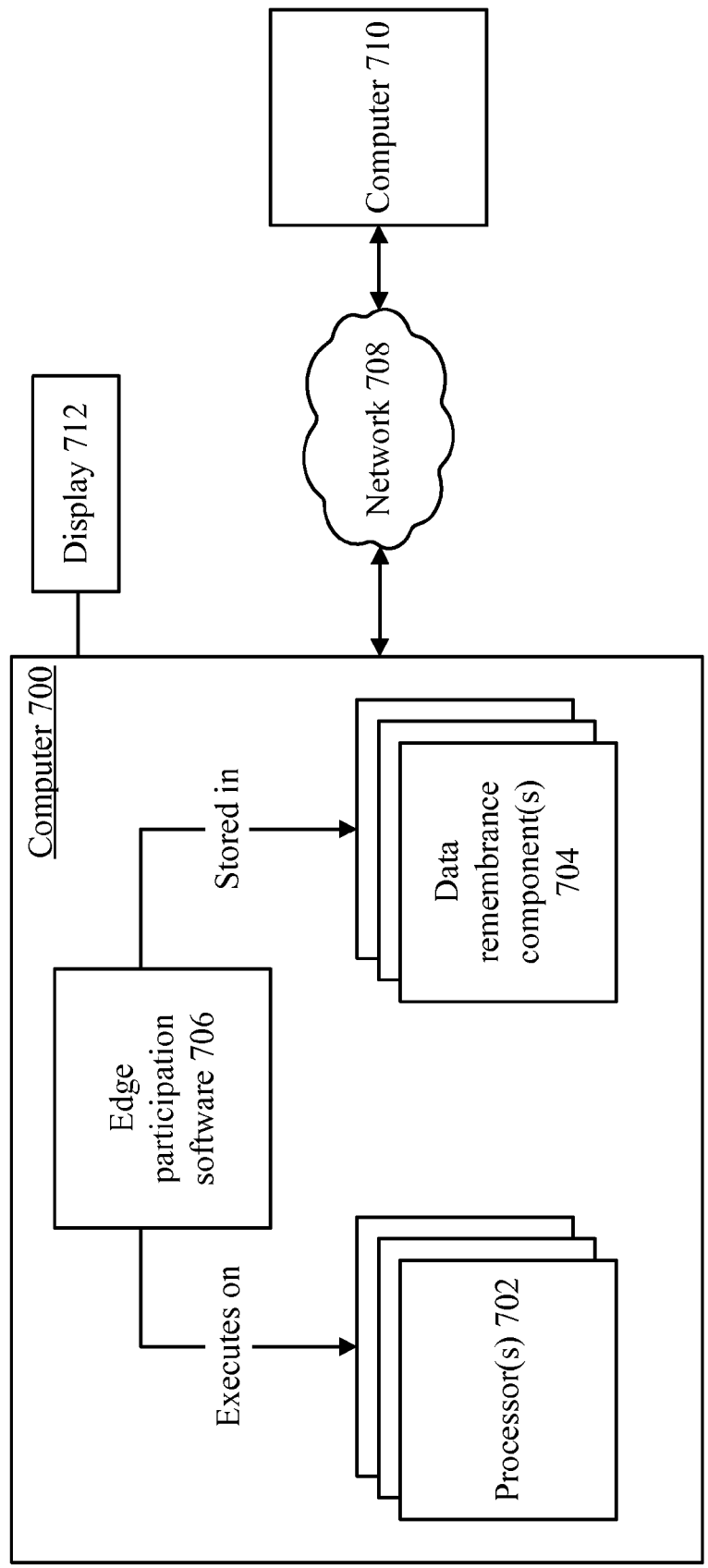
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is edge participation software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A personal computer in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as software having instructions to perform one or more acts of a method, where the instructions are stored on one or more computer-readable storage media. The instructions to perform the acts could be stored on one medium, or could be spread out across plural media, so that the instructions might appear collectively on the one or more computer-readable storage media, regardless of whether all of the instructions happen to be on the same medium.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions to perform a method of participating in a network cloud, the method comprising:
   sending a request to join said network cloud that is administered by an administrator;
   after said request has been approved, receiving, by a device that is not trusted by said administrator, a parameter that governs said device's participation in said network cloud, said parameter specifying (a) that said device is not allowed to transit data from one node in the cloud to another node in the cloud, (b) limits on which paths the device is allowed to specify for data that originates outside of the cloud, and (c) that said device is not allowed to specify a path for any data that said device receives from any node in the cloud;
   based on a map of said network cloud, selecting a path to a first node in said network cloud, said path specifying a next hop that is either said first node or a second node in said network cloud from which said first node is directly or indirectly reachable;
   inserting, into a frame that comprises data that has not been received by said device from any node in said network cloud, a tag that describes said path; and
   sending said frame to said next hop;
   the parameter that governs said device's participation in the network cloud being enforced by nodes in the cloud that are trusted by said administrator, enforcement being performed by said nodes' rejection of paths that violate any terms of said device's participation that are specified by said parameter.

2. The one or more computer-readable storage devices of claim 1, wherein said map is maintained by an administrator of said network cloud, said administrator not providing access to said map to untrusted nodes that participate in said network cloud, except to untrusted nodes whose participation in said network cloud is conditioned on not transiting data between nodes in said network cloud.

3. The one or more computer-readable storage devices of claim 1, wherein the method further comprises:
   providing, to an administrator of said network cloud, authentication information of said device.

4. The one or more computer-readable storage devices of claim 1, wherein said network cloud is a layer-2 (L2) cloud.

5. The one or more computer-readable storage devices of claim 1, wherein the method further comprises:
   creating an address table based on said map.

6. The one or more computer-readable storage devices of claim 1, wherein said parameter specifies a limit on paths that said device may use, and wherein said path is selected to observe said limit.

7. The one or more computer-readable storage devices of claim 1, wherein participation of said device in said network cloud is associated with a port, and wherein said sending of said frame comprises:
   sending said frame on said port.

8. The one or more computer-readable storage devices of claim 1, wherein said device is a physical device.

9. The one or more computer-readable storage devices of claim 1, wherein said device is a virtual device that is implemented, under control of a hypervisor, on a machine on which said hypervisor operates, said machine having a Media Access Control (MAC) address, participation of said device in said cloud being conditioned on data sent by said device being associated with said MAC address.

10. A method of admitting a device to participate in a network cloud, the method comprising:
    receiving, from said device, which is not trusted by an administrator of said network cloud, a request to participate in said network cloud;
    determining, based on authentication information provided by said device, that said device is permitted to participate in said network cloud;
    providing, to said device, a parameter that governs said device's participation in said network cloud, said parameter specifying (a) that said device is not allowed to transit data from one node in the cloud to another node in the cloud, (b) limits on which paths the device is allowed to specify for data that originates outside of the cloud, and (c) that said device is not allowed to specify a path for any data that said device receives from any node in the cloud;

receiving, from said device, a frame comprising a tag that specifies a path on which said frame is to be sent;

verifying that said tag complies with said parameter; and sending said frame to a first node in said network cloud in accordance with said path;

the parameter that governs said device's participation in the network cloud being enforced by nodes in the cloud that are trusted by said administrator, enforcement being performed by said nodes' rejection of paths that violate any terms of said device's participation that are specified by said parameter.

11. The method of claim 10, further comprising:
verifying whether said frame has been sent from a particular Media Access Control (MAC) address; and
taking a remedial action in an event that said frame has not been sent from said MAC address.

12. The method of claim 10, further comprising:
verifying whether said frame has been sent from a particular port; and
taking a remedial action in an event that said frame has not been sent from said port.

13. The method of claim 10, wherein said device requests to participate in a particular group within said network cloud, and wherein the method further comprises:
determining whether said device is permitted to participate in said group, wherein said parameter specifies whether said device is permitted to participate in said group.

14. The method of claim 10, further comprising:
transiting said frame to a second node, said transiting being performed by a node other than said device.

15. The method of claim 10, wherein said network cloud is at a first network layer, and wherein the method further comprises:
providing, by said first node, data in said frame to a second network layer to allow said data in said frame to be consumed.

16. An apparatus comprising:
a network interface associated with a Media Access Control (MAC) address;
a hypervisor;
a virtual machine that is implemented by said hypervisor, and that participates in a network cloud as an edge device by inserting a tag into a frame, said tag specifying a path on which said frame is to be sent to a node in said network cloud, said path being based on a map maintained by an administrator of said network cloud, wherein said administrator does not trust said virtual machine, participation of said virtual machine in said network cloud being governed by conditions that (a) said virtual machine not transit data that said virtual machine receives from nodes in said network cloud, (b) that said virtual machine obey limits on which paths it may specify for data, and (c) that said virtual machine is not allowed to specify a path for any data that said virtual machine receives from any node in the cloud;

the conditions that governs said virtual machine's participation in the network cloud being enforced by nodes in the cloud that are trusted by said administrator, enforcement being performed by said nodes' rejection of paths that violate any terms of said virtual machine's participation that are specified by said conditions.

17. The apparatus of claim 16, wherein said network cloud is an L2 cloud.

18. The apparatus of claim 16, wherein said administrator provides a parameter to said virtual machine that govern said virtual machine's participation in said network cloud, said parameter specifying a limit on paths that said virtual machine may specify in said tag.

19. The apparatus of claim 16, wherein participation of said edge device in said network cloud is associated with a port, and wherein said edge device sends said frame into said network cloud through said port.

20. The apparatus of claim 16, wherein said edge device provides, to said administrator, a hash or signature that is usable to authenticate said edge device.

* * * * *